US009094910B2

(12) United States Patent
Wu (10) Patent No.: US 9,094,910 B2
(45) Date of Patent: Jul. 28, 2015

(54) METHODS UTILIZED IN MOBILE DEVICE FOR HANDLING SITUATIONS WHEN TIME ALIGNMENT TIMER EXPIRES, AND MOBILE DEVICE THEREOF

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 707 days.

(21) Appl. No.: 12/207,480

(22) Filed: Sep. 9, 2008

(65) Prior Publication Data

US 2010/0061361 A1   Mar. 11, 2010

(51) Int. Cl.
*H04J 3/06* (2006.01)
*H04W 56/00* (2009.01)

(52) U.S. Cl.
CPC .................. *H04W 56/0045* (2013.01)

(58) Field of Classification Search
USPC ........................... 370/328, 329, 338, 341, 350
See application file for complete search history.

(56) References Cited

U.S. PATENT DOCUMENTS

| 2007/0265012 | A1* | 11/2007 | Sorbara et al. | 455/446 |
|---|---|---|---|---|
| 2008/0310396 | A1* | 12/2008 | Park et al. | 370/350 |
| 2009/0268693 | A1* | 10/2009 | Lindh et al. | 370/336 |
| 2009/0298524 | A1* | 12/2009 | Kuo | 455/509 |
| 2009/0300457 | A1* | 12/2009 | Kuo | 714/749 |
| 2010/0182992 | A1* | 7/2010 | Chun et al. | 370/350 |
| 2010/0265896 | A1* | 10/2010 | Park et al. | 370/329 |
| 2010/0296454 | A1* | 11/2010 | Park et al. | 370/328 |

FOREIGN PATENT DOCUMENTS

| WO | 2008096984 A1 | 8/2008 |
|---|---|---|
| WO | 2008104097 A1 | 9/2008 |

OTHER PUBLICATIONS

[Jeju], [Unreliable uplink and network controlled connection release], [Aug. 18, 2008-Aug. 22, 2008], [2 pages], [R2-083913], [3GPP TSG-RAN WG2 #63], [Korea].
LG Electronics Inc: "UE Specific Sync Timer singalling and procedure", 3GPP TSG-RAN WG2 #60bis, R2-080153, Jan. 14-18, 2008, pp. 1-3, XP050138033, Sevilla , Spain.
LG Electronics Inc: "Handling of Nacked Date in HARQ Buffer When UL State is Out of Sync", 3GPP TSG-RAN WG2 #63, R2-084392, Aug. 18-22, 2008, pp. 1-2, XP002523066, Jeju, South Korea.
Ericsson, Qualcomm Europe : "E-UTRA MAC protocol specification update", 3GPP TSG-RAN2 Meeting #63, R2-083902, Aug. 18-22, 2008, pp. 1-32, XP050319092, Jeju, Korea.
Office action mailed on Jul. 10, 2012 for the European application No. 09000104.1, p. 1-5.
Ericsson, "Details of SDU Discard Function", TSG-RAN WG2 Meeting #60bis, R2-080230, Jan. 5-9, 2008, Sevilla, Spain, p. 1-5, XP050138097.

(Continued)

*Primary Examiner* — Michael Thier
*Assistant Examiner* — Feben M Haile
(74) *Attorney, Agent, or Firm* — Winston Hsu; Scott Margo (57) ABSTRACT

A method utilized in a mobile device includes: starting a time alignment timer when receiving a time alignment message transmitted by a base station, wherein the time alignment timer is used for determining whether the mobile device is synchronized with the base station on uplink timing, and the time alignment message is utilized to update timing advance for the mobile device; and ignoring at least a first control message sent from the base station after the time alignment timer expires.

4 Claims, 8 Drawing Sheets

(56) References Cited

OTHER PUBLICATIONS

3GPP TS 36.321 V8.0.0 (Dec. 2007), 3rd Generation Partnership Project; Technical Specification Group Radio Access Network; Evolved Universal Terrestrial Radio Access (E-UTRA) Medium Access Control (MAC) protocol specification (Release 8), pp. 1-22.
3GPP TS 36.300 V8.5.0 (May 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 49-51.
Office action mailed on Mar. 11, 2014 for the European application No. 09000104.1, p. 1-5.
Ericsson, "Handling of Timing Advance during RA", TSG-RAN WG2 Meeting #62, R2-082736, Kansas City, USA, May 5-9, 2008 (updated R2-082403), p. 1-4.

\* cited by examiner

METHODS UTILIZED IN MOBILE DEVICE FOR HANDLING SITUATIONS WHEN TIME ALIGNMENT TIMER EXPIRES, AND MOBILE DEVICE THEREOF

BACKGROUND OF THE INVENTION

1. Field of the Invention

The present invention relates to a wireless communication scheme, and more particularly, to methods utilized in a wireless communication system for handling the situation when a time alignment timer expires, and a mobile device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, if a mobile device such as a mobile phone desires to connect to the Internet or communicate with other mobile phones via the LTE system, the mobile device firstly needs to be synchronized with a base station that serves the mobile device on uplink timing. The purpose of being synchronized with the base station is to prevent signals transmitted from the mobile device from colliding with other signals sent from other mobile devices under the coverage of the base station. In general, a time alignment timer of the mobile device is utilized for indicating whether the mobile device is synchronized with the base station on uplink timing. When the time alignment timer is running, uplink timing synchronization is still established. If the time alignment timer expires, then this indicates that the mobile device is not synchronized with the base station on uplink timing.

SUMMARY OF THE INVENTION

One of the objectives of the claimed invention is to provide novel methods and a related mobile device utilized in a wireless communication system for handling the condition when a time alignment timer of the mobile device expires.

According to first and third embodiments of the claimed invention, a method utilized in a mobile device is disclosed. The method comprises the following steps: starting a time alignment timer when receiving a time alignment message transmitted by a base station, wherein the time alignment timer is used for determining whether the mobile device is synchronized with the base station on uplink timing, and the time alignment message is utilized by the base station to update timing advance for the mobile device; and ignoring at least a first control message sent from the base station after the time alignment timer expires.

According to second, forth, and fifth embodiments of the claimed invention, a method utilized in a mobile device is disclosed. The method comprises the following steps: starting a time alignment timer when receiving a time alignment message transmitted by a base station, wherein the time alignment timer is used for determining whether the mobile device is synchronized with the base station on uplink timing, and the time alignment message is utilized by the base station to update timing advance for the mobile device; and performing a random access procedure for obtaining uplink synchronization when the time alignment timer expires and at least one of a first event and a second event occurs, wherein the first event comprises an event which downlink grant information included within a control message sent by the base station is received, and the second event comprises an event which the mobile device has data to be transmitted and a buffer status report of the mobile device is not triggered.

According to the first and third embodiments of the claimed invention, a mobile device is disclosed. The mobile device comprises a communication unit, a control unit, and a time alignment timer. The communication unit is used for communicating with a base station, and the control unit is used for controlling the communication unit; the time alignment timer is used for determining whether the mobile device is synchronized with the base station on uplink timing. The control unit starts the time alignment timer when the communication unit receives a time alignment message transmitted by the base station, wherein the time alignment message is utilized to update timing advance for the mobile device. The communication unit ignores at least a first control message sent from the base station to the mobile device after the time alignment timer expires.

According to the second, forth, and fifth embodiments of the claimed invention, a mobile device is disclosed. The mobile device comprises a communication unit, a control unit, and a time alignment timer. The communication unit is used for communicating with a base station, and the control unit is used for controlling the communication unit; the time alignment timer is used for determining whether the mobile device is synchronized with the base station on uplink timing. The control unit starts the time alignment timer when the communication unit receives a time alignment message transmitted by the base station, wherein the time alignment message is utilized to update timing advance for the mobile device. The control unit further controls the communication unit to perform a random access procedure for obtaining uplink synchronization when the time alignment timer expires and at least one of a first event and a second event occurs, wherein the first event comprises an event which the communication unit receives downlink grant information included within a control message sent by the base station, and the second event comprises an event which the communication unit has data to be transmitted and a buffer status report in the communication unit is not triggered.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
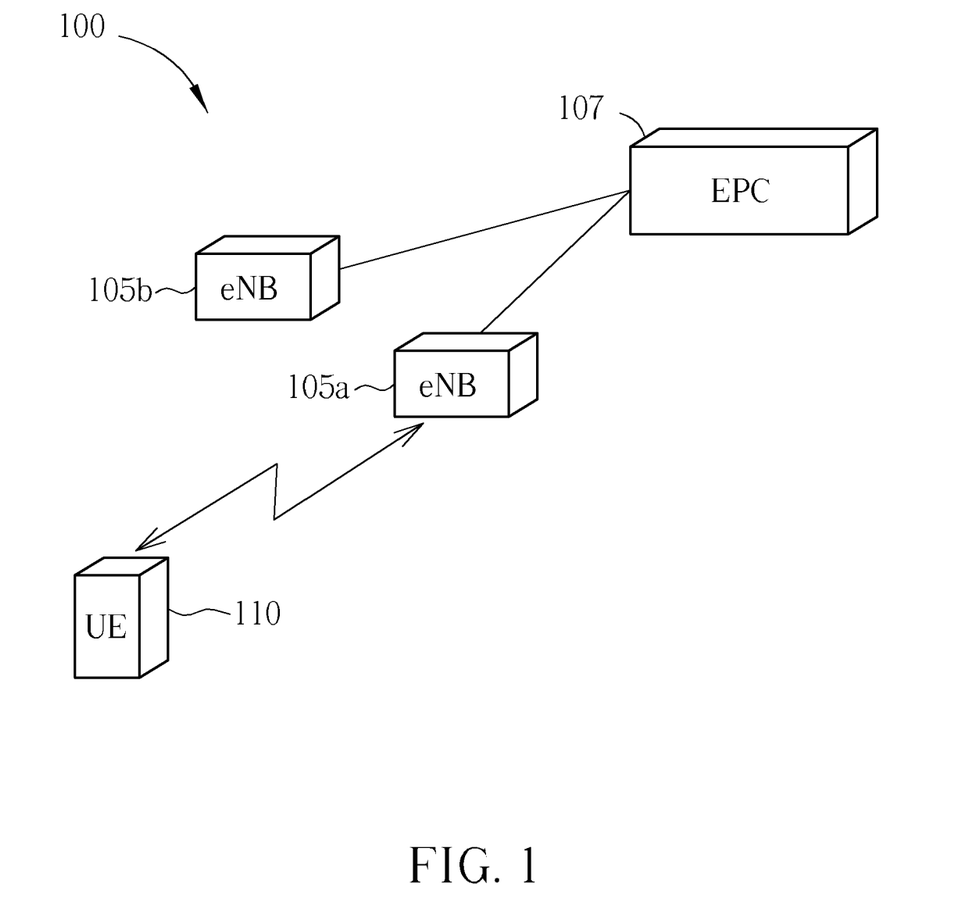
FIG. 1 is a diagram of a wireless communication system such as a LTE communication system according to embodiments of the present invention.

Please refer to FIG. 1. FIG. 1 is a diagram of a wireless communication system 100 such as a LTE communication system according to embodiments of the present invention. The communication system 100 offers the 3GPP Long Term Evolution ("LTE") network, i.e. the next-generation network beyond 3G. The communication system 100 includes a core network ('evolved packet core, EPC' of LTE technology), and multiple base stations ('evolved Node B, eNB' of LTE technology) and may include many mobile stations/devices (named 'user equipment' in the LTE technology) such as mobile phones respectively served by the base stations. For simplicity, only a user equipment (UE) 110 is shown in FIG. 1. In order to communicate with the eNB 105a for downlink (DL) data or uplink (UL) data, it is necessary for the UE 110 to establish a point-to-point bi-directional connection between the Radio Resource Control (RRC) entities on the UE 110 and the eNB 105a, i.e. an RRC connection. When the RRC connection has been established and is still not released, the UE 110 is in an RRC_CONNECTED state; otherwise, when the RRC connection has been released, the UE 110 is in an RRC_IDLE state. In addition, when the UE 110 is in the RRC_CONNECTED state, the UE 110 is designed to monitor a physical downlink control channel (PDCCH) to receive control message(s) transmitted by the eNB 105a; there are several PDCCH formats respectively defining different control messages including uplink (UL) grant information, downlink (DL) grant information, and downlink (DL) data arrival information, etc.

Figure 2:
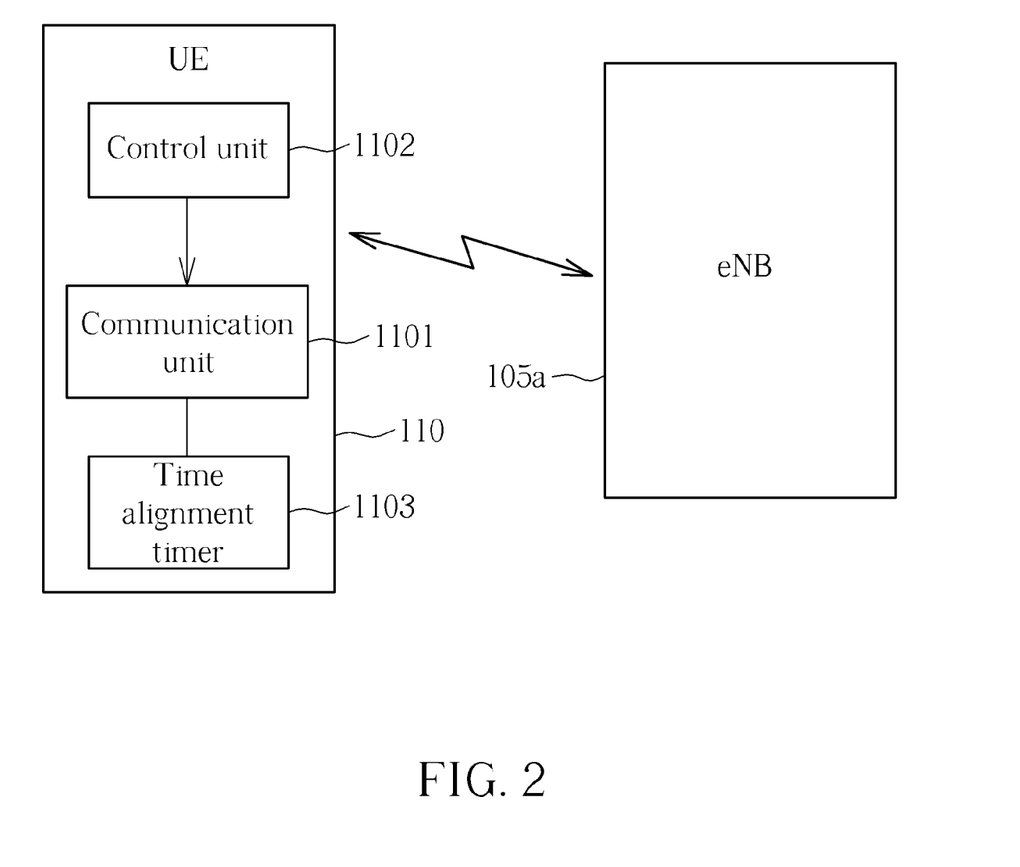
FIG. 2 is a block diagram showing an eNB and a UE shown in FIG. 1.

Please refer to FIG. 2. FIG. 2 is a block diagram showing the eNB 105a and the UE 110 shown in FIG. 1. The UE 110 comprises a communication unit 1101, a control unit 1102, and a time alignment timer 1103. The communication unit 1101 is used for communicating with the base station, and the control unit 1102 is used for controlling the communication unit 1101; the time alignment timer 1103 is used for determining whether the UE 110 is synchronized with the eNB 105a on uplink timing. When the time alignment timer 1103 is running, the UE 110 considers that the uplink timing synchronization between the eNB 105a and itself is established; otherwise, the UE 110 considers that the eNB 105a is not synchronized with itself on uplink timing. Further, the control unit 1102 is arranged to start/restart the time alignment timer 1103 once the communication unit 1101 receives a time alignment message transmitted by the eNB 105a, wherein the time alignment message (usually referred as to a time alignment command) is utilized by the eNB 105a to update timing advance for the UE 110. That is, the control unit 1102 of the UE 110 maintains the time alignment timer 1103 for uplink timing synchronization, and the eNB 105a transmits the time alignment command to make the control unit 1102 of the UE 110 restart the time alignment timer 1103. Usually, the time alignment command is contained in a specific media access control packet data unit (MAC PDU) transmitted by the eNB 105a.

In addition, the communication unit 1101 is arranged to ignore at least a first control message sent from the eNB 105a to the UE 110 after the time alignment timer 1103 expires. This is because all physical uplink control channels (PUCCH) are released once the time alignment timer 1103 expires. In other words, on the condition that the PUCCHs are released, even though the communication unit 1101 successfully receives a MAC PDU sent from the eNB 105a, the communication unit 1101 cannot send an acknowledgement message to the eNB 105a, to notify the eNB 105a that the MAC PDU transmitted by the eNB 105a is successfully received. Of course, if the communication unit 1101 does not successfully receive the MAC PDU, the communication unit 1101 cannot send a negative acknowledgement message to the eNB 105a, to notify the eNB 105a that the MAC PDU transmitted by the eNB 105a is not received. Accordingly, the communication unit 1101 is designed to ignore at least a first control message sent from the eNB 105a to the UE 110 after the time alignment timer 1103 expires. In particular, in the first embodiment, it is assumed that the first control message (transmitted via the PDCCH) includes downlink grant information, and the communication unit 1101 is arranged to discard the first control message after the time alignment timer 1103 expires, without receiving at least a data message associated with the downlink grant information.

Figure 3:
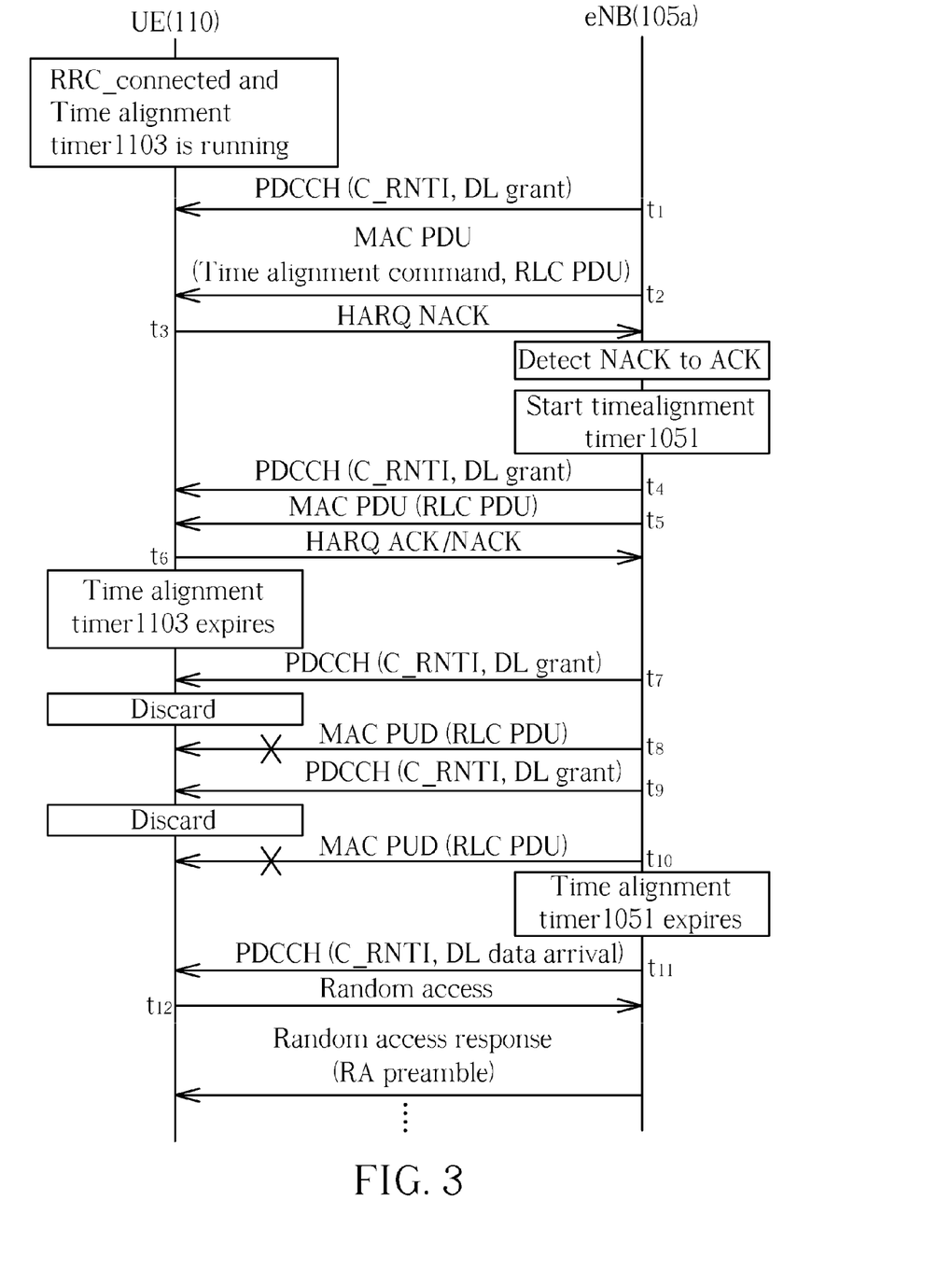
FIG. 3 is a sequential diagram of an interaction between the UE and eNB shown in FIG. 2 according to a first embodiment of the present invention.

Please refer to FIG. 3, which illustrates a sequential diagram of an interaction between the UE 110 and eNB 105a according to the first embodiment. As shown in FIG. 3, initially, the UE 110 is in the RRC_CONNECTED state, and the time alignment timer 1103 is still running; that is, the UE 110 is synchronized with the eNB 105a on uplink timing. The eNB 105a sends a control message via the PDCCH at time $t_1$, which includes downlink (DL) grant information and a cell radio network temporary identity (C_RNTI) corresponding to the UE 110, to notify the UE 110 that a MAC PDU associated with the DL grant information will be transmitted to the UE 110 thereafter. Then, the eNB 105a sends the MAC PDU comprised by a time alignment command and radio link control (RLC) PDU to UE 110 at time $t_2$. In this embodiment, the UE 110 does not successfully receive the MAC PDU, so the time alignment timer 1103 is not restarted. Since the MAC PDU is not successfully received by the UE 110, the communication unit 1101 sends a negative acknowledgement (NACK) message to the eNB 105a utilizing a hybrid automatic repeat request (HARQ) scheme at time $t_3$. The NACK message, however, is erroneously considered to a general acknowledgement (ACK) message, so the eNB 105a considers that the time alignment timer 1103 is restarted and then may not need to repeatedly send the time alignment command to the UE 110. Afterwards, the eNB 105a sends another control message including the C_RNTI and DL grant information to the UE 110 at time $t_4$, and then sends a MAC PDU including RLC PDU without the time alignment command to the UE 110 at time $t_5$. The UE 110 sends an ACK message or a NACK message to the eNB 105a at time $t_6$, according to whether the MAC PDU is successfully received by the UE 110 or not. The time alignment timer 1103 subsequently expires, and the control unit 1102 controls the communication unit 1101 to discard at least a first control message sent from the eNB 105a after the expiration of the time alignment timer 1103. Before a time alignment timer 1051 of the eNB 105a expires, the eNB 105a, however, considers that the UE 110 is synchronized with itself on uplink timing. When the time alignment timer 1051 is running, the eNB 105a may repeatedly try to send the first control messages including the DL grant information and the associated data messages (i.e. MAC PDUs) to the UE 110. Accordingly, when the time alignment timer 1103 expires but the time alignment timer 1051 is still running, the UE 110 is designed to discard at least one control message including the DL grant information transmitted via the PDCCH and does not receive the associated MAC PDU(s). Without doubt, the UE 110 can be designed to discard a plurality or all of the control messages including the DL grant information and does not receive the associated MAC PDUs when the time alignment timer 1103 expires but the time alignment timer 1051 is still running. For example, the communication unit 1101 of the UE 110 discards control messages sent from the eNB 105a at times $t_7$ and $t_9$ respectively, and does not receive the following MAC PDUs sent from the eNB 105a at times $t_8$ and $t_{10}$. This also obeys the spirit of the present invention.

When the time alignment timer 1051 expires, the eNB 105a transmits a second control message via the PDCCH at time $t_{11}$, which includes the DL data arrival information instead of the DL grant information. Once the communication unit 1101 receives the second control message including the DL data arrival information, the control unit 1102 controls the communication unit 1101 to perform a random access procedure for obtaining the uplink (UL) timing synchronization. For instance, the random access procedure is performed by transmitting a random access preamble to the eNB 105a at time $t_{12}$.

Figure 4:
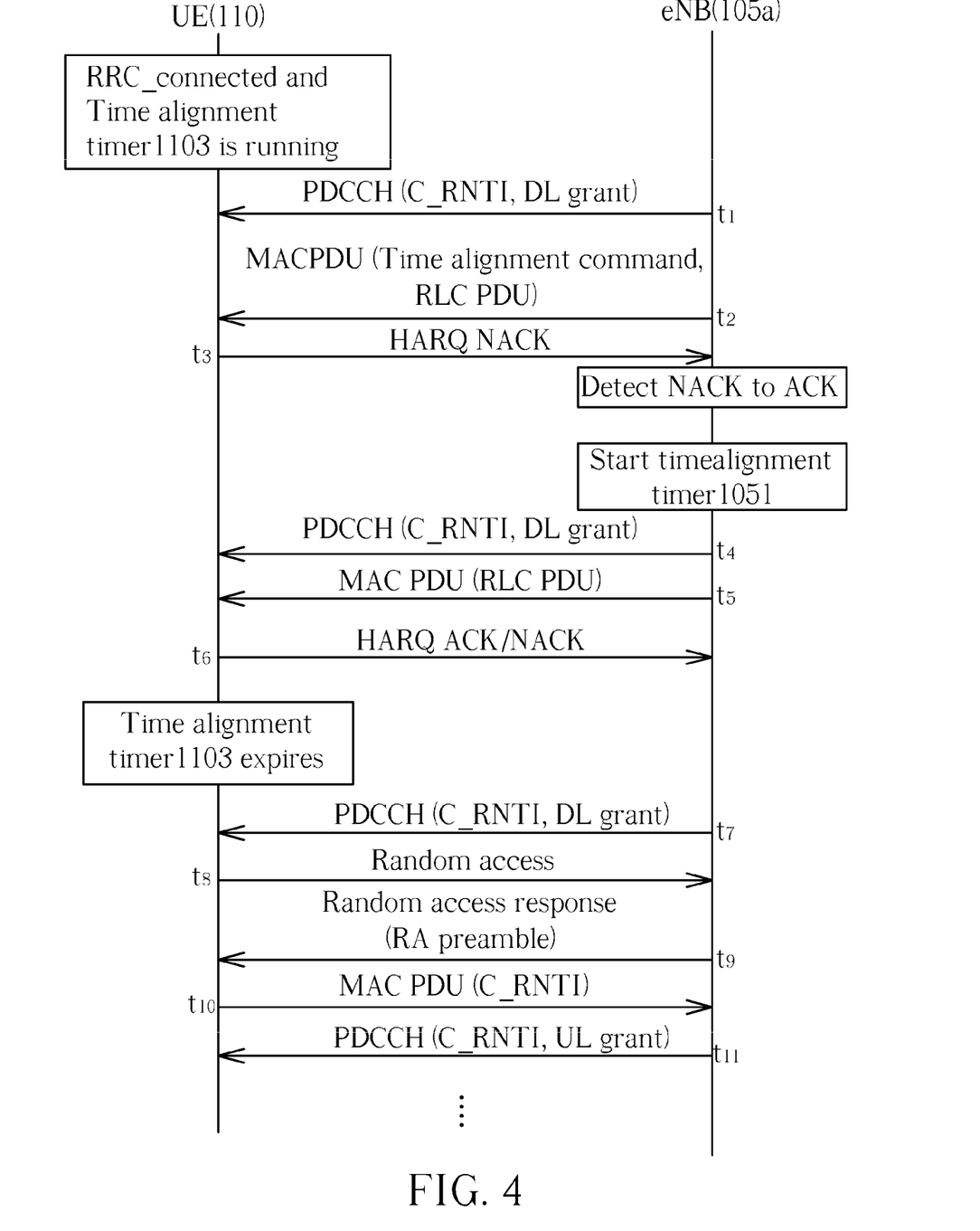
FIG. 4 is a sequential diagram of an interaction between the UE and eNB shown in FIG. 2 according to a second embodiment of the present invention.

Please refer to FIG. 4, which illustrates a sequential diagram of an interaction between the UE 110 and eNB 105a according to a second embodiment of the present invention. In order to get uplink timing synchronization as soon as possible, the control unit 1102 in the second embodiment is arranged to control the communication unit 1101 to perform a random access procedure immediately for obtaining uplink timing synchronization when the time alignment timer 1103 expires and the communication unit 1101 receives a control message sent by the eNB 105a, which includes the DL grant information. That is, when the UE 110 is not synchronized with the eNB 105a on uplink timing and receives the DL grant information, the UE 110 actively performs the random access procedure to get uplink timing synchronization. For example, as shown in FIG. 4, when the time alignment timer 1103 expires and the UE 110 receives a control message including the DL grant information at time $t_7$, the UE 110 instantly performs the random access procedure at time $t_8$. The following steps include: the eNB 105a then sends a random access response at time $t_9$; the UE 110 sends a MAC PDU containing a C_RNTI for contention resolution at time $t_{10}$; and the eNB 105a then sends a control message containing the C_RNTI and UL grant information via PDCCH at time $t_{11}$. Since the random access procedure succeeds, the uplink timing synchronization is obtained. Therefore, downlink data reception will not be delayed too much longer. Additionally, considering that the UE 110 may not have data to be transmitted but actively performs the random access procedure, in the second embodiment, the control unit 1102 is arranged to control the communication unit 1101 to transmit a dummy transport block data (i.e. a dummy MAC PDU) from the UE 110 to the eNB 105a for completing the contention resolution process corresponding to the actively initiated random access procedure. The dummy MAC PDU carries the C_RNTI associated with the UE 110 but does not carry upper layer data. Please note that the eNB 105a is assumed to be able to appreciate that the uplink timing synchronization is obtained if the UE 110 subsequently transmits a message corresponding to the random access response to the eNB 105a. Thus, once the eNB 105a receives the message, the eNB 105a may restart the time alignment timer 1051. Therefore, under this condition, the time alignment timer 1051 will not expire. This is not intended to be a limitation of the present invention.

Figure 5:
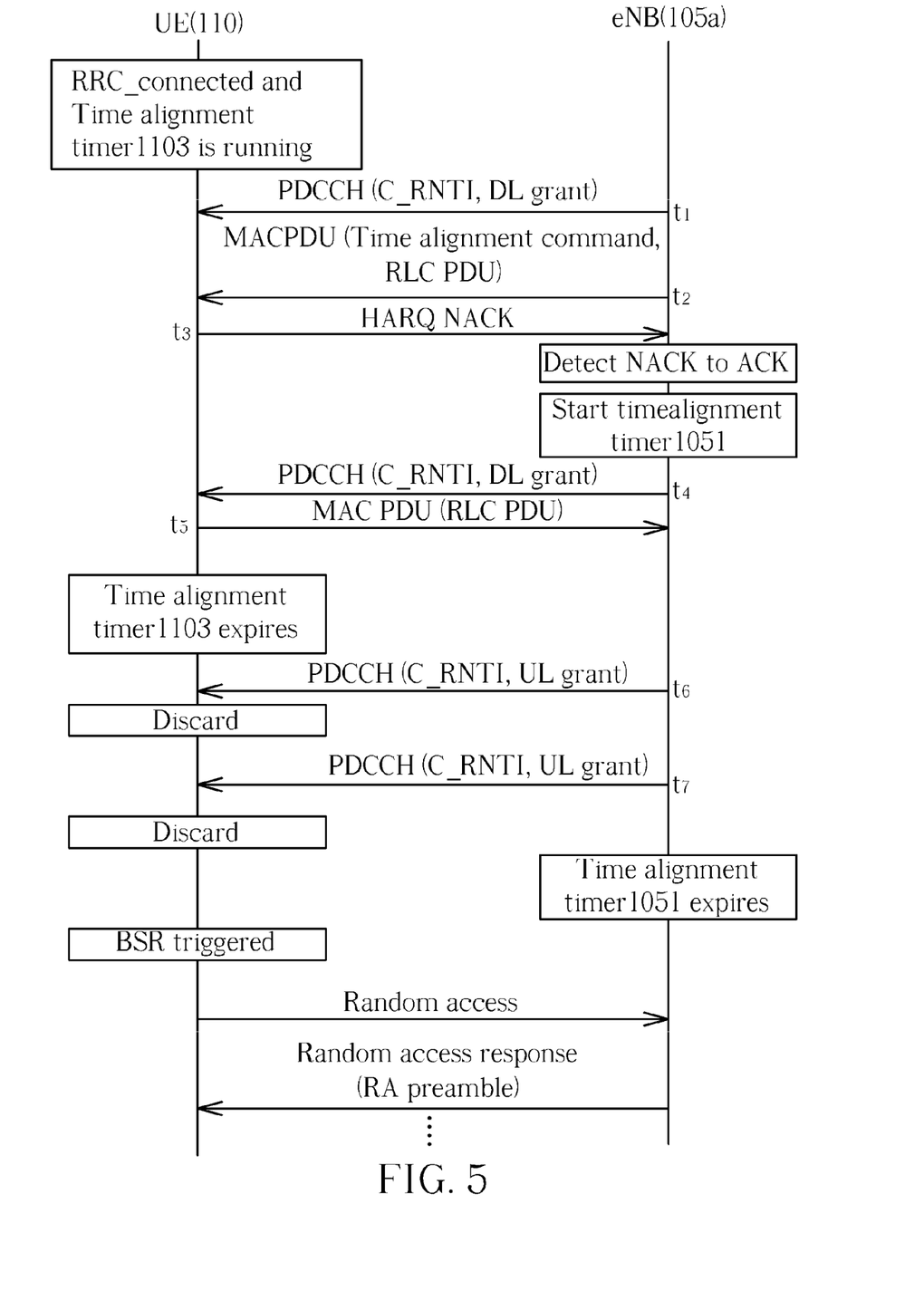
FIG. 5 is a sequential diagram of an interaction between the UE and eNB shown in FIG. 2 according to a third embodiment of the present invention.

Please refer to FIG. 5, which illustrates a sequential diagram of an interaction between the UE 110 and eNB 105a according to a third embodiment of the present invention. As shown in FIG. 5, initially, the UE 110 is in the RRC_CONNECTED state, and the time alignment timer 1103 is still running. The eNB 105a sends a control message via the PDCCH at time $t_1$ to notify the UE 110 that a MAC PDU associated with the DL grant information will be transmitted to the UE 110 thereafter, wherein the control message includes the C_RNTI and the DL grant information. The eNB 105a then sends the MAC PDU including a time alignment command to UE 110 at time $t_2$. In the third embodiment, the UE 110 does not successfully receive the MAC PDU, so the time alignment timer 1103 is not restarted by the time alignment command. Since the MAC PDU is not successfully received by the UE 110, the communication unit 1101 sends a NACK message to the eNB 105a utilizing the HARQ scheme at time $t_3$. The NACK message, however, is erroneously accounted as a general ACK message, so the eNB 105a considers that the time alignment timer 1103 is restarted and then may not need to repeatedly send the time alignment command to the UE 110. Subsequently, the eNB 105a sends another control message including the C_RNTI and the UL grant information to the UE 110 at time $t_4$, and then the UE 110 sends a MAC PDU including an RLC PDU and its buffer status report (BSR)(be not shown in the figure) to the eNB 105a at time $t_5$. The time alignment timer 1103 subsequently expires, and the control unit 1102 is arranged to ignore at least a first control message sent from the eNB 105a at time $t_6$ after the expiration of the time alignment timer 1103; the first control message includes UL grant information. In particular, the communication unit 1101 of the third embodiment is designed to discard a plurality or all of the first control messages. For instance, the communication unit 1101 is arranged to discard the first control messages respectively sent from the eNB 105a at times $t_6$ and $t_7$. Since the first control messages are discarded, the UE 110 does not send any data to the eNB 105a. Until a regular/periodic BSR of the UE 110 is triggered, the control unit 1102 does not control the communication unit 1101 to perform a random access procedure for obtaining uplink timing synchronization. An advantage is that the power of the UE 110 is saved if the UE 110 has no data to be transmitted to the eNB 105a.

Figure 6:
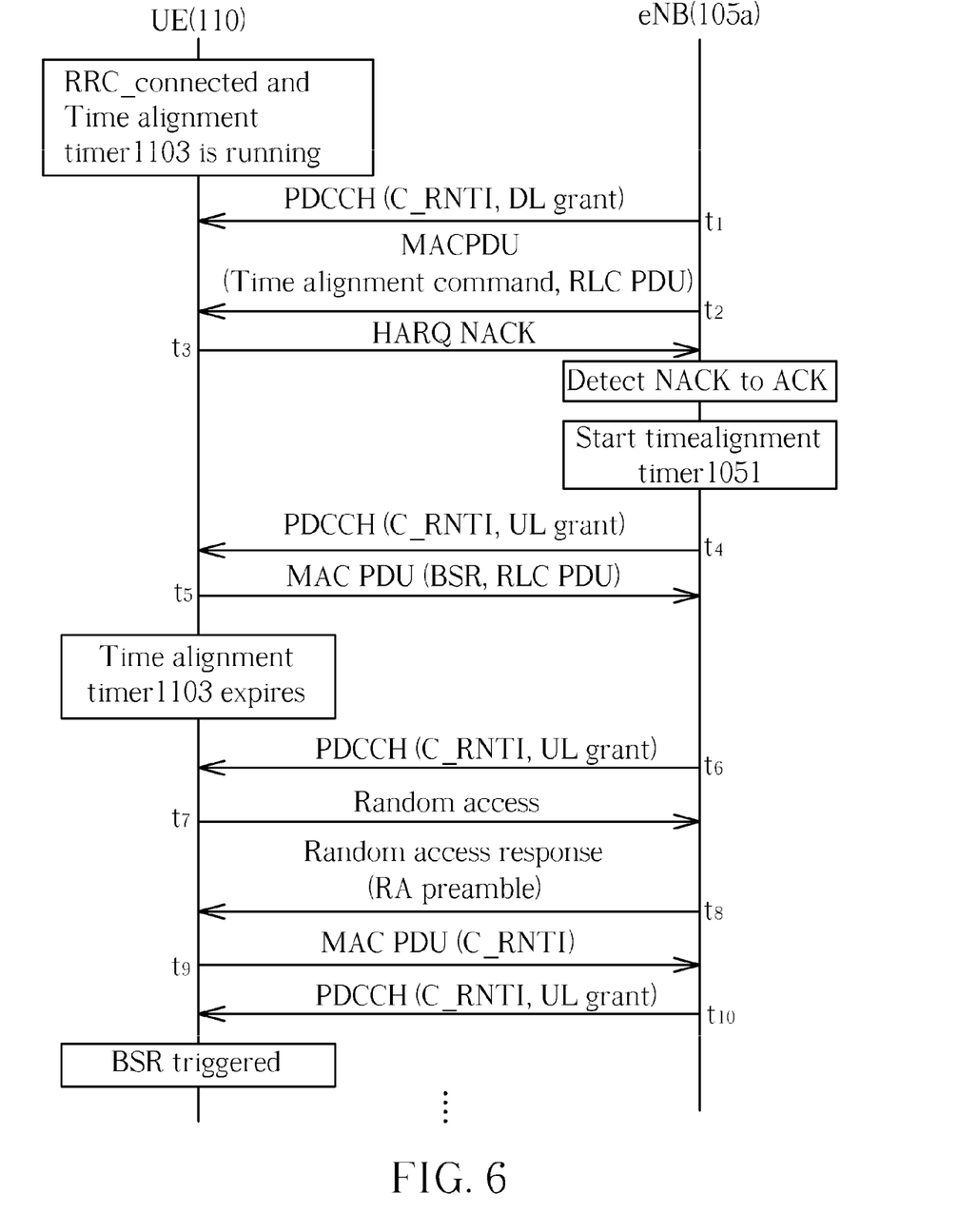
FIG. 6 is a sequential diagram of an interaction between the UE and eNB shown in FIG. 2 according to a fourth embodiment of the present invention.

A fourth embodiment is provided in the present invention. Please refer to FIG. 6, which illustrates a sequential diagram of an interaction between the UE 110 and eNB 105a according to the fourth embodiment of the present invention. In the fourth embodiment, besides still being arranged to start the time alignment timer 1103 when the communication unit 1101 receives the time alignment command transmitted by the eNB 105a, the control unit 1102 is designed to control the communication unit 1101 to perform a random access procedure for obtaining uplink timing synchronization when the time alignment timer 1103 expires and at least one of a first event and a second event occurs. The first event herein comprises an event which the communication unit 1101 receives UL grant information included within a control message sent by the eNB 105a. The second event is defined to comprise an event which the communication unit 1101 has data to be transmitted and a regular/periodic BSR in the communication unit 1101 is not triggered. In this embodiment, the communication unit 1101 performs a random access procedure for obtaining uplink timing synchronization when the time alignment timer 1103 expires and both the first and second events occur. As shown in FIG. 6, the eNB 105a sends a first control message including the C_RNTI and UL grant information to the UE 110 at time $t_6$. Once the communication unit 1101 receives the UL grant information, the UE 110 has data to be transmitted, and a regular/periodic BSR is not triggered, the communication unit 1101 is controlled by the control unit 1102 to perform the random access procedure at time t₇. Although the following steps include: the UE 110 sends a MAC PDU containing a C_RNTI for contention resolution at time t₉ and the eNB 105a then sends a control message containing the C_RNTI and UL grant via PDCCH at time t₁₀, the UE 110 still can soon become synchronized with the eNB 105a on uplink timing. In addition, the BSR still can be triggered corresponding to the random access procedure to the eNB 105a for completing a contention resolution process.

Figure 7:
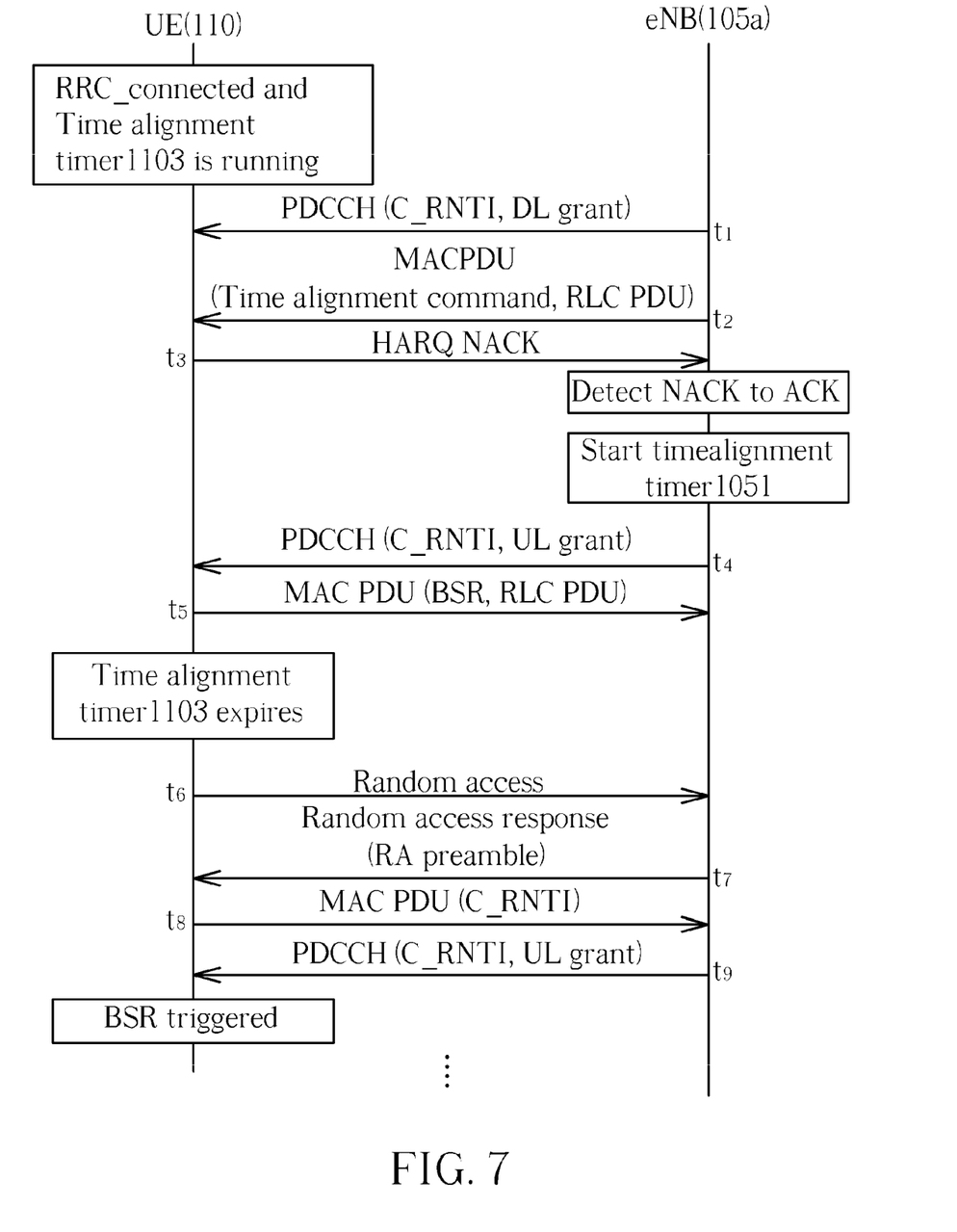
FIG. 7 is a sequential diagram of an interaction between the UE and eNB shown in FIG. 2 according to a fifth embodiment of the present invention.

In addition, the UE 110 having data to be transmitted in its buffer indicates that the uplink timing synchronization is required to transmit the data, so the control unit 1102 can be designed to immediately control the communication unit 1101 to perform the random access procedure. Please refer to FIG. 7, which illustrates a sequential diagram of an interaction between the UE 110 and eNB 105a according to a fifth embodiment of the present invention. As shown in FIG. 7, the control unit 1102 is arranged to immediately control the communication unit 1101 to perform the random access procedure at time t₆ for obtaining uplink timing synchronization when the time alignment timer 1103 expires and a second event occurs (i.e. the UE 110 has data to be transmitted and a regular/periodic BSR is not triggered). That is, before receiving any control message transmitted by the eNB 105a, the communication unit 1101 immediately performs the random access procedure if the time alignment timer 1103 expires, the UE 110 has data to be transmitted, and a regular/periodic BSR is not triggered, regardless of whether the control message including the UL grant information is received or not. In the fifth embodiment, since the random access procedure succeeds at time t₉, the UE 110 can be synchronized earlier with the eNB 105a on uplink timing. The MAC PDU at time t₈ may include a BSR to update the buffer status to eNB 105a for precise UL scheduling. In addition, the BSR still can be triggered corresponding to the random access procedure to the eNB 105a for completing a contention resolution process.

Figure 8:
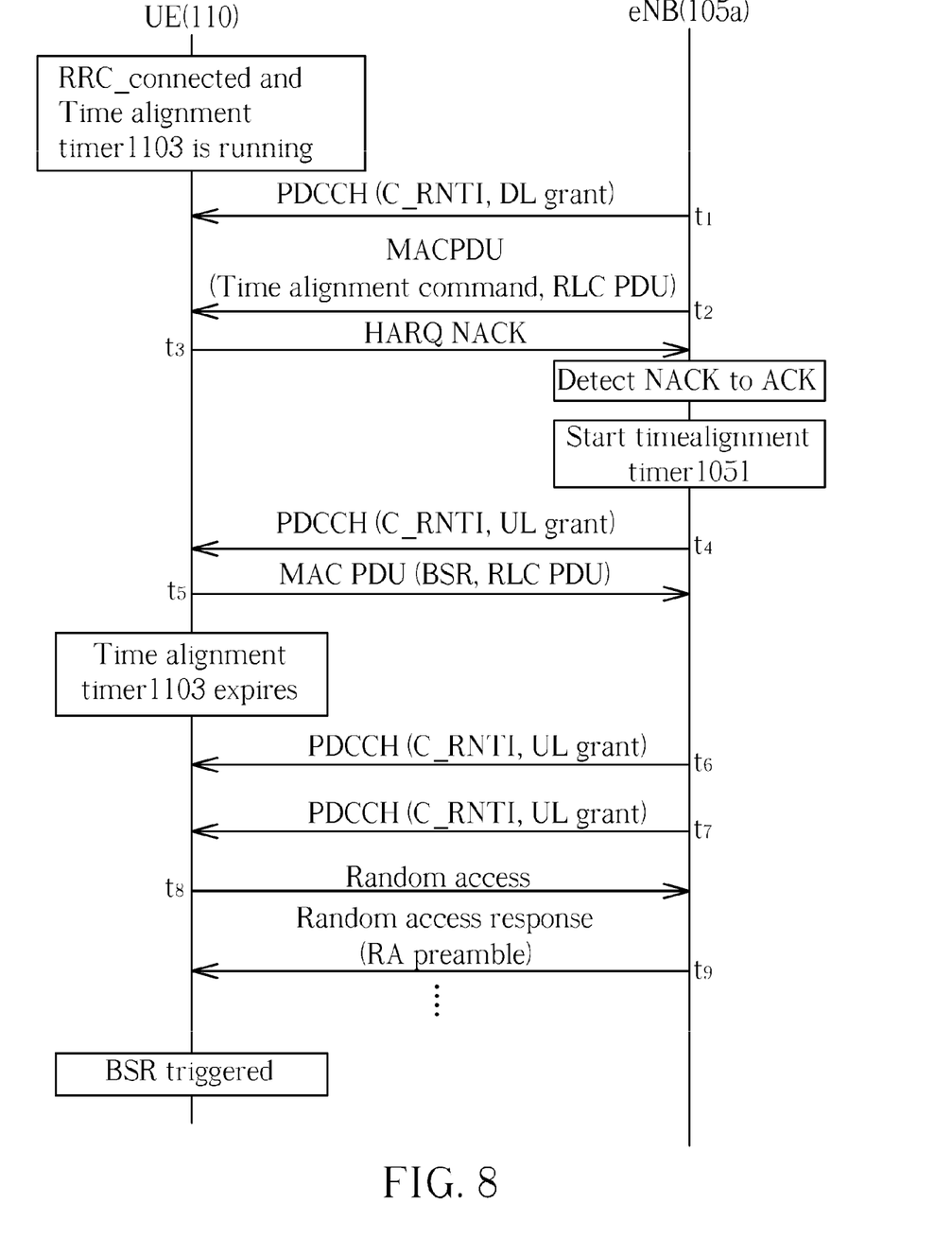
FIG. 8 is a sequential diagram of an interaction between the UE and eNB shown in FIG. 2 according to a sixth embodiment of the present invention.

Moreover, in another embodiment, when the time alignment timer 1103 expires, the UE 110 has data to be transmitted, and a regular/periodic BSR is not triggered, the control unit 1102 can control the communication unit 1101 to perform the random access procedure after the communication unit 1101 receives a specific control message sent from the eNB 105a. Please refer to FIG. 8, which illustrates a sequential diagram of an interaction between the UE 110 and eNB 105a according to a sixth embodiment of the present invention. As shown in FIG. 8, the communication unit 1101 is designed to immediately perform the random access procedure for obtaining uplink timing synchronization at time t₈ after receiving a specific control message transmitted by the eNB 105a at time t₇. This also falls within the scope of the present invention. It should be noted that the eNB 105a in the fourth, fifth, and the sixth embodiments is assumed to be able to appreciate that the uplink timing synchronization is obtained if the UE 110 subsequently transmits a message corresponding to the random access response to the eNB 105a. Once the eNB 105a receives the message, the eNB 105a may restart the time alignment timer 1051. Therefore, under this condition, the time alignment timer 1051 will not expire. This is not intended to be a limitation of the present invention.

Moreover, the expiration of the time alignment timer 1103 is not limited to occurring when a NACK message is erroneously considered as a general ACK message; the expiration of the time alignment timer 1103 may occur due to other conditions. This is not meant to be a limitation of the present invention.

Those skilled in the art will readily observe that numerous modifications and alterations of the device and method may be made while retaining the teachings of the invention.

What is claimed is:

1. A method utilized in a mobile device, the method comprising:
   starting a time alignment timer when receiving a time alignment message transmitted by a base station, wherein the time alignment timer is used for determining whether the mobile device is synchronized with the base station on uplink timing, and the time alignment message is utilized to update timing advance for the mobile device;
   ignoring at least a first control message, which comprises a downlink grant and at least one associated data message or comprises an uplink grant, sent from the base station by a communication unit and transmitted via a physical downlink control channel (PDCCH), by discarding the first control message after the time alignment timer expires without receiving the at least one associated data message or without transmitting data to the base station according to the uplink grant; and
   starting a random access procedure for obtaining uplink synchronization by transmitting a random access preamble to the base station, once a buffer status report is triggered to update a buffer status of the mobile device for the base station for precise uplink scheduling after the time alignment timer has expired or once the mobile device receives a second control message via the PDCCH comprising downlink data arrival information sent by the base station after the time alignment timer has expired.

2. The method of claim 1, wherein the step of ignoring the first control message sent from the base station comprises:
   discarding the first control message after the time alignment timer of the mobile device has expired.

3. A mobile device, comprising:
   a communication unit, for communicating with a base station;
   a control unit, for controlling the communication unit; and
   a time alignment timer, for determining whether the mobile device is synchronized with the base station on uplink timing;
   wherein the control unit starts the time alignment timer when the communication unit receives a time alignment message transmitted by the base station, the time alignment message is utilized to update timing advance for the mobile device; and
   the communication unit ignores at least a first control message, which comprises a downlink grant and at least one associated data message or comprises an uplink grant, sent from the base station to the mobile device and transmitted via a physical downlink control channel (PDCCH), by discarding the first control message after the time alignment timer expires without receiving the at least one associated data message or without transmitting data to the base station according to the uplink grant;
   the control unit controls the communication unit to start a random access procedure for obtaining uplink synchronization by transmitting a random access preamble to the base station, once a buffer status report is triggered to update a buffer status of the mobile device for the base station for precise uplink scheduling after the time alignment timer has expired or once the communication unit receives a second control message via the PDCCH comprising downlink data arrival information sent by the base station after the time alignment timer has expired.

4. The mobile device of claim 3, wherein the communication unit discards the first control message after the time alignment timer of the mobile device has expired.

\* \* \* \* \*